INVENTORS
Akio Yanagimachi
Takashi Iwasawa
Hitoshi Masuko
Keiichi Yaguchi
BY
Stevens, Davis, Miller & Mosher
ATTORNEYS INVENTORS
Akio Yanagimachi
Takashi Iwasawa
Hitoshi Masuko
Keiichi Yaguchi
BY
Stevens, Davis, Miller & Mosher
ATTORNEYS INVENTORS
Akio Yanagimachi
Takashi Iwasawa
Hitoshi Masuko
Keiichi Yaguchi BY
Stevens, Davis, Miller & Mosher
ATTORNEYS United States Patent Office 3,454,713
Patented July 8, 1969

3,454,713

TAPE CONTROLLING SYSTEM OF MAGNETIC RECORDING AND REPRODUCING DEVICES

Akio Yanagimachi, Kawasaki, Takashi Iwasawa, Yokohama, and Hitoshi Masuko and Keiichi Yaguchi, Tokyo, Japan, assignors to Japan Broadcasting Corporation, Tokyo, Japan Filed Oct. 11, 1965, Ser. No. 494,473
Claims priority, application Japan, Oct. 17, 1964, 39/58,953
Int. Cl. H04n *5/78*; G11b *15/18*
U.S. Cl. 178—6.6 8 Claims

ABSTRACT OF THE DISCLOSURE

A video tape recording and reproducing system, wherein the recording tape is pulled back by means of a shift mechanism by a certain length which corresponds to build-up time of forward running of the tape. Frame pulses are reproduced from the magnetic tape in the stationary state by means of a rotary control track head means which rotates in the forward direction of tape. The tape can be started by the driving mechanism at an instant decided by a phase difference between the above-mentioned frame pulses and standard frame pulses so that the tape is driven at a normal forward running speed after the build-up time. The system is able to selectively reproduce a stop-motion television picture at any desired instant during the reproduction of a slow motion television picture and also restart the slow-motion picture reproduction in a minimum period corresponding to a build-up time of the driving mechanism.

This invention relates to a tape controlling system of magnetic recording and reproducing devices comprising a means for pulling back a magnetic tape by using a shift mechanism including an arm, and a means for detecting frame pulses previously recorded on the magnetic tape at its static and pulled back condition and to determine the starting time of running of the tape, and thus to control the starting time of build-up running of the magnetic tape required for stable synchronized running of the tape according to the stopping position of the tape in said pulled back condition. More particularly, the invention relates to a tape controlling system of a magnetic recording and reproducing device, which is suitable as a video tape recording device, which reproduces a television signal of slow-motion picture or stop-motion picture from a television signal recorded on said tape.

The inventors had proposed a television signal reproducing system for obtaining five-time slow-motion reproducing signal by using a four-head video tape recording device and succeeded to contribute for the quick reporting possibility of a television news programs, as disclosed in U.S. patent application No. 398,221, now Patent 3,395,248 issued July 30, 1968.

The present invention relates to an improved slow-motion video tape recording and reproducing device of the above mentioned type, which is able to reproduce a so-called stop-motion picture continually from a slow-motion picture reproducing condition and to reproduce said slow-motion picture again from the stop-motion picture reproducing condition within a very short period.

In order that the present invention may readily be carried into effect, reference is made to the accompanying drawings, in which, FIG. 1 illustrates a schmatic diagram of a slow-motion video tape recording device of the known type;

FIG. 2 shows diagrammatically an embodiment of a tape controlling system of magnetic recording and reproducing device according to the invention;

FIG. 3–*a* shows a perspective view of a rotary control track head drum;

FIG. 3–*b* is a plan view of the drum shown in FIG. 3–*a*;

FIGS. 3–*c* to 3–*e* are alternative embodiments of the drum shown in FIG. 3–*b*;

Figure 1:
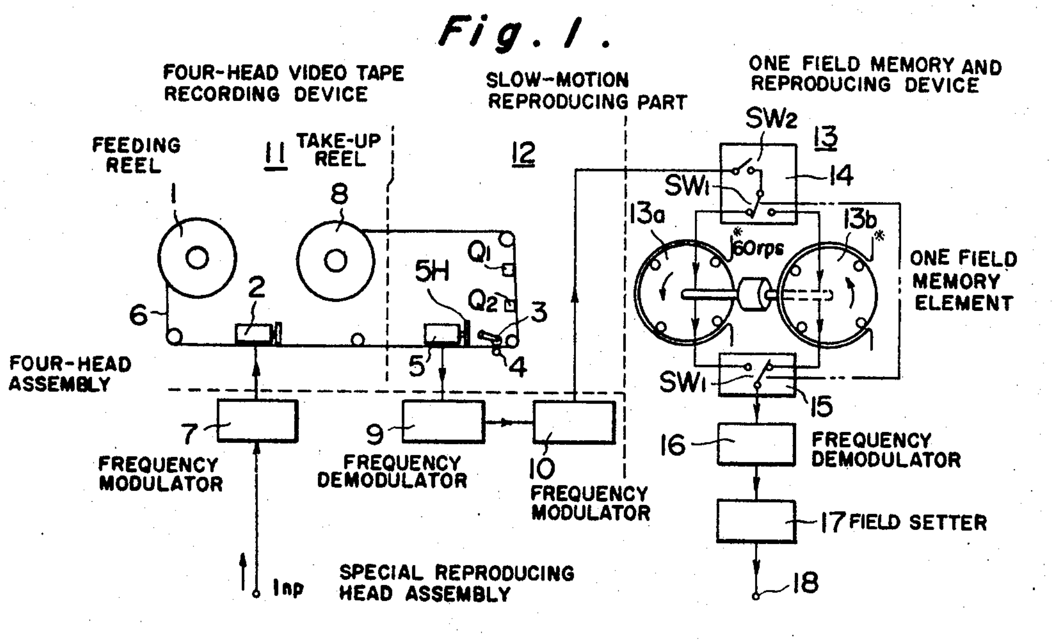

Before explaining the present invention, said proposed slow-motion video tape recording device will be explained with referring to FIG. 1. By applying a television signal at the picture signal input terminal I*np* of the device, this signal is applied via a frequency modulator 7 to a four-head assembly 2 for recording the signal. A magnetic tape 6, supplied from a feeding reel 1 to a take-up reel 8 with a standard velocity, is in contact with each head of said four-head assembly 2 and thus recorded magnetically said frequency modulated television signal in a plurality of recording tracks in the direction of width of the magnetic tape. After recording of the television signal the recorded tape 6 is once rewound into the feeding reel 1. Then at the reproduction of the television signal the tape 6 is supplied in a reduced velocity for instance ⅕ of its recording velocity and passes a special reproducing head assembly 5, a pinch roller 3, a capstan 4, a cue signal recording head $Q_1$ and a cue signal reproducing head $Q_2$ and wound up by the take-up reel 8. During the running of the tape, the recorded television signal of one complete field is reproduced by the special reproducing head assembly 5 for five field periods. In the drawing the part 11 is a conventional four-head video tape recording device, for example, like a known Ampex type tape recorder, part 12 is a slow-motion reproducing part and part 13 is a one field memory and reproducing device.

During the slow-motion picture reproduction period, the running tape in the slow-motion reproducing part 12 is controlled with 6 c./s. master control signal which is synchronized with a standard vertical synchronizing signal and is driven in a reduced rate of ⅕ of its recording. The special reproducing head assembly 5 intermittently reproduces the frequency modulated signal and supplies the frequency modulated signal to a frequency demodulator 9. The frequency demodulator 9 demodulates the signal and supplies the signal to a frequency modulator 10, in which the signal is again modulated in frequency and supplied via switcher 14 to the one field memory and reproducing part 13· In the part 13 the signal is recorded in either side of one field memory elements 13*a* and 13*b*, as an endless one field signal. The controlling of the switching over of said memory elements 13*a* and 13*b* is effected by switch $sw_1$ of switcher 14 while closing switch $sw_2$. Assuming the signal is recorded in one field memory element 13*a*, said same signal is continuously reproduced during the succeeding five field periods via a play back switcher 15, a frequency demodulator 16 and a field setter 17 and thus five-time slow picture reproduction is obtained. During the five field periods, when said one field memory element 13a is reproducing the signal, the next field signal of the intermittently supplied signal is recorded on the another field memory element 13b. The switching over of the reproduction of the memory elements 13a and 13b is effected by switch $sw_1$ of the switcher 15 in synchronism with switch $sw_1$ of the switcher 14 by a standard 12 c./s. By the alternative reproduction of the memory elements 13a and 13b, the intermittently reproduced signal in the slow-motion reproducing part 12 is exactly reproduced and a continuous slow-motion picture signal is obtained.

As soon as a stop-motion instruction is delivered, the operating switch $sw_2$ of the switcher 14 is changed over to its rest position and also the intermittent switching over of the switches $sw_1$ of the switcher 14 and 15 is stopped. Therefore the one field memory element which is reproducing the recorded signal at the time of the instruction will not be changed over at the termination of said five field periods and it continues the reproduction and thus produces a stop-motion picture. In the meanwhile, the exact instant of the change over to the reproduction of stop-motion picture is recorded on a cue track of the tape 6 by the cue signal recording head $Q_1$ of the slow-motion reproducing part 12.

Thereafter the tape driving system in the slow-motion reproducing part 12 is set to rewinding condition. In this condition the reproducing head $Q_2$ reproduces and traces back the cue signal recorded by the cue signal recording head $Q_1$ and brings the tape into the reproducing position.

As soon as the next instruction of the slow-motion reproduction is delivered, the tape again starts its slow running and within a few seconds it is pulled into a synchronism with 6 c./s. master control signal and keeps a stable constant speed running. At the instant when the head $Q_1$ detects the recorded cue signal, the condition of continuous reproduction of either one of the one field memory elements 13a and 13b is changed into a condition of alternative reproduction of said memory elements, and a slow-motion picture reproduction is obtained in the same manner as described above. The interval between head $Q_1$ and $Q_2$ is predetermined so as to correspond to a minimum distance of the tape required to its build-up running period of synchronizing with 6 c./s. master control signal.

As described the changing over to and from a slow-motion picture reproduction condition from and to a stop-motion picture reproduction condition is always carried out by running the recorded tape in the slow-motion reproducing part 12 in synchronism with 6 c./s. master control signal and the rotation of the special reproducing head assembly 5 is controlled by a synchronizing rotation of high grade accuracy in order to obtain a satisfactory standard television signal reproduction.

However, said device has several disadvantages that it requires about 6 seconds for the build-up running of synchronizing with 6 c./s. master control signal, and moreover it requires about 2 seconds for the rewinding of the tape which corresponds to said 6 seconds' running, and therefore altogether, 8 seconds, is a minimum period for reproducing a stop-motion picture of the recorded signal. In other words, in the conventional devices, the minimum operating time for the changing over of reproducing pictures is considerably long, and therefore the conventional devices can not fulfill the requirements of the quick changing over at an instant when a stop-motion picture reproduction is desired to be changed over to a slow-motion picture reproduction.

This invention has for its object to mitigate said disadvantages of the conventional video tape recording and reproducing devices, and in order to fully satisfy the requirements of the production of broadcasting programs, the time required for the changing over of the pictures is materially decreased. In accordance with the present invention said minimum time required for the changing over from a stop-motion picture to a slow-motion picture can be reduced in the order of 1.8 seconds, and an instantaneous stop-motion controlling of slow-motion video tape recording and reproducing device can be obtained. More particularly, this invention concerns to an improvement of such slow-motion reproducing part 12 as shown in FIG. 1. Such means to obtaining a stop-motion picture by continuously reproducing said one field memory element, means to running the tape in synchronism with 6 c./s. master control signal and to changing back from a stop-motion picture to a slow-motion picture by using a cue signal are basically of the same functioning principle with that of the above mentioned slow-motion video tape recording and reproducing device.

In order to decrease the minimum time required for a slow-motion picture reproduction from a stop-motion picture, it is necessary to decrease the time required for the build-up running for synchronization of the running tape and to decrease the tape rewinding time.

The system of the present invention comprises (1) a rotary control track head means for controlling the starting operation of the tape running system and (2) an arm means for pulling back said tape.

Figure 2:
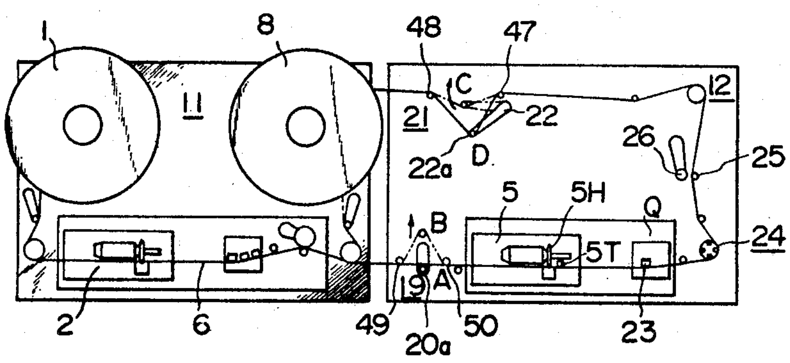

FIG. 2 shows a slow-motion video tape recording and reproducing device, of which the tape controlling system is constructed in accordance with one embodiment of the present invention, in which corresponding elements to those of FIG. 1 are designated by same reference numerals.

In FIG. 2, frequency modulated input television signal is recorded by four head assembly 2 on a magnetic tape 6 as is described in FIG. 1. The recorded tape 6 passes through a tape pulling back mechanism 19, comprising a pulling back roller 20a and fixed guide rollers 49 and 50, a special reproducing head assembly 5, which reproduces intermittently said recorded signal, a cue signal recording and reproducing head 23, which records and reproduces an instant of changing over from a slow-motion picture reproduction to a stop-motion picture reproduction, a rotary control track head assembly 24, which controls the starting time of the tape running, a pinch roller 25, a capstan 26, and a tape tension mechanism 21, comprising a tension arm 22a and fixed guard rollers 47 and 48, and then wound up by take-up reel 8.

For the better understanding of the present invention, before explaining the overall function of the system of the present invention the above mentioned items (1) and (2) will be separately explained.

(1) *Rotary control track head means for controlling the starting operation of the tape running system.*—In the abovementioned conventional tape running system (FIG. 1), at first the capstan motor is controlled as to drive the video tape that the 6 c./s. frame pulses recorded on the control track of the video tape (these pulses were recorded in the tape at the rate of 30 c./s., however the tape is driven at a reduced rate of ⅕ for obtaining a slow-motion picture signal and therefore the reproduced pulses just correspond to 6 c./s.) coincide with the 6 c./s. master control pulses, which are derived from standard vertical synchronizing signal. Then the capstan motor, which drives the capstan 26, is more exactly controlled as to drive the video tape that the control track pulses of 48 c./s. recorded in control track of the video tape (these pulses were recorded in the tape at a rate of 240 c./s., however as the tape speed is decreased to ⅕ the pulse frequency also decreased to 48 c./s.) become into coincidence with a 48 c./s., which is obtained from ⅕ stepping down of a 240 c./s. rotary signal derived from the rotation of head drum of special reproducing head assembly 5.

In such a tape running control system, assuming that the build-up condition of the tape running is always constant, the phase difference between 6 c./s. frame pulse obtained from the tape at an instant that the tape is just reached to a constant velocity of running and said standard 6 c./s. master control pulse depends upon the stationary position of the tape and at an instant when the tape started running. As this phase difference will be corrected after the build-up of the tape running to a constant speed by controlling the rotation of the capstan roller, the larger the initial phase difference the longer the time required for the correction of the phase difference.

Therefore, it is true that the phase difference correcting time can be shortened by eliminating said initial phase error by setting the stopping position of the tape at a predetermined position and starting the tape running system at an instant having a certain relation with the standard 6 c./s. master control pulses, however, in the conventional system it was very difficult to stop the tape exactly at a predetermined position in a very limited time.

In accordance with the present invention, the aforementioned difficulty can be obviated by using a rotary control head means, which will be described in more detail hereinafter. Assuming the initial phase difference be $\Delta\theta$, which is the phase difference between phase of reproduced frame pulses reproduced by control track load 5T provided in the special reproducing head assembly 5 of FIG. 2 and that of standard frame pulses at an instant that the build-up of tape running just reached at a constant velocity. Also assuming that the tape starting time is given at a certain phase relation with the phase of the standard frame pulses and the deviation between the stopping position of the tape, which will cause said initial phase difference $\Delta\theta$ to be zero and the actual stopping position of the tape is $\Delta x$ and the deviation of the starting time of the tape running to that of the standard time of the tape running is $\Delta t$. $\Delta\theta$ is given by the following Equation 1;

$$\Delta\theta=a_1\Delta x+a_2\Delta t \quad (1)$$

in which $a_1=\partial\theta/\delta x$, $a_2=\partial\theta/\partial t$. In the above equation, $\theta$ is tape running phase, i.e. the phase of reproduced frame pulses, $a_1$ is an interval of recorded pattern of the frame pulses and $a_2$ is a pulse frequency of the frame pulses, respectively.

The aforementioned controlling system of predetermining the tape stopping position includes a sequence of processes of $\Delta x\rightarrow 0$, $\Delta t\rightarrow 0$ and thus $\Delta\theta\rightarrow 0$ is obtained. However it is rather difficult to effect $\Delta x\rightarrow 0$ in a very short period. Therefore considering that $a_1$ and $a_2$ are both constant figures, the following relation can be obtained.

$$\Delta t=-\frac{a_1}{a_2}\Delta x \quad (2)$$

By controlling the starting time of the tape running $\Delta t$ as a variable according to the deviation $\Delta x$ of the tape stopping position, thus the initial phase deviation $\Delta\theta$ can be decreased to zero regardless of the tape stopping position.

In obtaining said relationship, a measurement of the deviation $\Delta x$ of the tape stopping position and a means for the transformation from said $\Delta x$ to $\Delta t$ are required. According to the invention a rotary control track head means is employed for the measurement of the stopping position of the tape. By detecting the phase of recorded frame pulses by this head means, the phase of the reproduced frame pulses corresponds to a direct transformation of the tape stopping position into time base. In this case the transferring factor of the transformation is $-a_1/a_2$. Therefore, $$a_1/a_2=dt/dx=1/v$$

in which $v$ is the tape running velocity. In the controlling system of the invention the relative velocity between the rotary control track head means and the tape is controlled to be $-v$ when the tape is in a stopping condition (i.e. the relative velocity is zero, when the tape is in a standard running condition) and to drive in synchronism with the standard frame pulse. In the system of the invention, by driving a pinch roller of the tape running system by frame pulses detected by said rotary control track head means, the tape can be always controlled its running in a relationship of $\Delta\theta\rightarrow 0$ regardless of its stopping position.

FIGS. 3–*a* and 3–*b* show the rotary control track head assembly 24 mounted at such position that its lower part is facing to the control track 29 of video tape 6. The number of these heads are determined by the tangent angle of the tape wrapping over the circular periphery of the rotary control track head assembly 24. In the shown embodiment the tangent angle of the tape wrapping is selected to be slightly less than 90° and there are four heads arranged at equidistance on the periphery. This rotary control track head assembly 24 is driven by a synchronous motor 27, and according to the reason as above mentioned it is driven in a certain relation with 6c./s. master control pulses. The direction of the rotation is as shown in the figure by an arrow.

By determining the starting time of the tape running system using 6 c./s. frame pulses, which are obtained from the recorded tape by means of aforementioned rotary control track head assembly 24, the tape can be controlled to start in fulfilling the condition of Equation 2. Therefore, it is possible to obtain the initial phase deviation $\Delta\theta$ be zero at the end of the build-up running period regardless of the tape stopping position, and thereafter the tape controlling system can be quickly synchronized exactly by the control signal of 48 c./s.

As shown in the figure, four heads 24H are arranged at the periphery of lower cylinder part, namely head drum **24*b* of the assembly 24, in each position of aparting 90° each other and at the vertical position facing to the control track 29 of the tape 6. These four heads 24H are driven by a hysteresis type synchronous motor 27 at a peripheral velocity of 3 inches per second in a direction of the arrow as shown in the figure. The cylindrical part 24*a* of the assembly 24 is constructed so as to rotate freely and thus decreases rotating friction at the tape stopping condition and during the fast winding and rewinding operation. The rotational phase of said heads drum 24*b* is controlled by comparing 6 c./s. rotational phase signal derived by a photoelectric cell provided at the intermediate axis of the driving mechanism 30 with the reference 6 c./s. master control signal. By varying said rotational phase of the rotary control track head assembly 24, the starting time of the tape running can be controlled. The signal from the rotary control head assembly 24 is dervied from a series connection of the four heads via slip-ring mechanism 28** and supplied to controlling circuit after amplification and shaping of the frame pulse.

(2) *Tape pulling back mechanism with an arm.*—In accordance with the present invention an introduction of rotary control head assembly 24 makes it possible to decrease the build-up synchronizing time of tape running compared with the conventional system as described above, the required tape length which must be pulled back at an instruction of stop-motion may always be a constant length corresponding to one second (3 inches). Therefore according to the invention, such means can be omitted with as is in the conventional system, that the rewinding of the tape is stopped by using a recorded cue signal by $Q_1$ head and detecting it by $Q_2$ head.

In the system of the invention the tape is pulled back about 3 inches as shown in FIG. 2 by driving a pulling back roller **20*a* in the direction of indicated arrow with a solenoid of pulling back mechanism 19. In this case as the reels 1 and 8 are both applied brake forces, the tape length pulled back by the pulling back roller 20*a* is supplied from a reserved length of the tape at a tension arm 22, which is pulled by the tension of the tape in the direction of arrow, while applying a constant tension to the tape. These members 22 and 20*a* return the original position at the instant when a slow-motion instruction is delivered again. During the build-up period of tape running, the supply reel 1 stand still and the tape is supplied from the reserved length of the pulling back roller 20***a*. By the aforementioned means the build-up operation is always kept constant regardless of the length of tape pulled back by the roller 20*a*.

Figure 4:
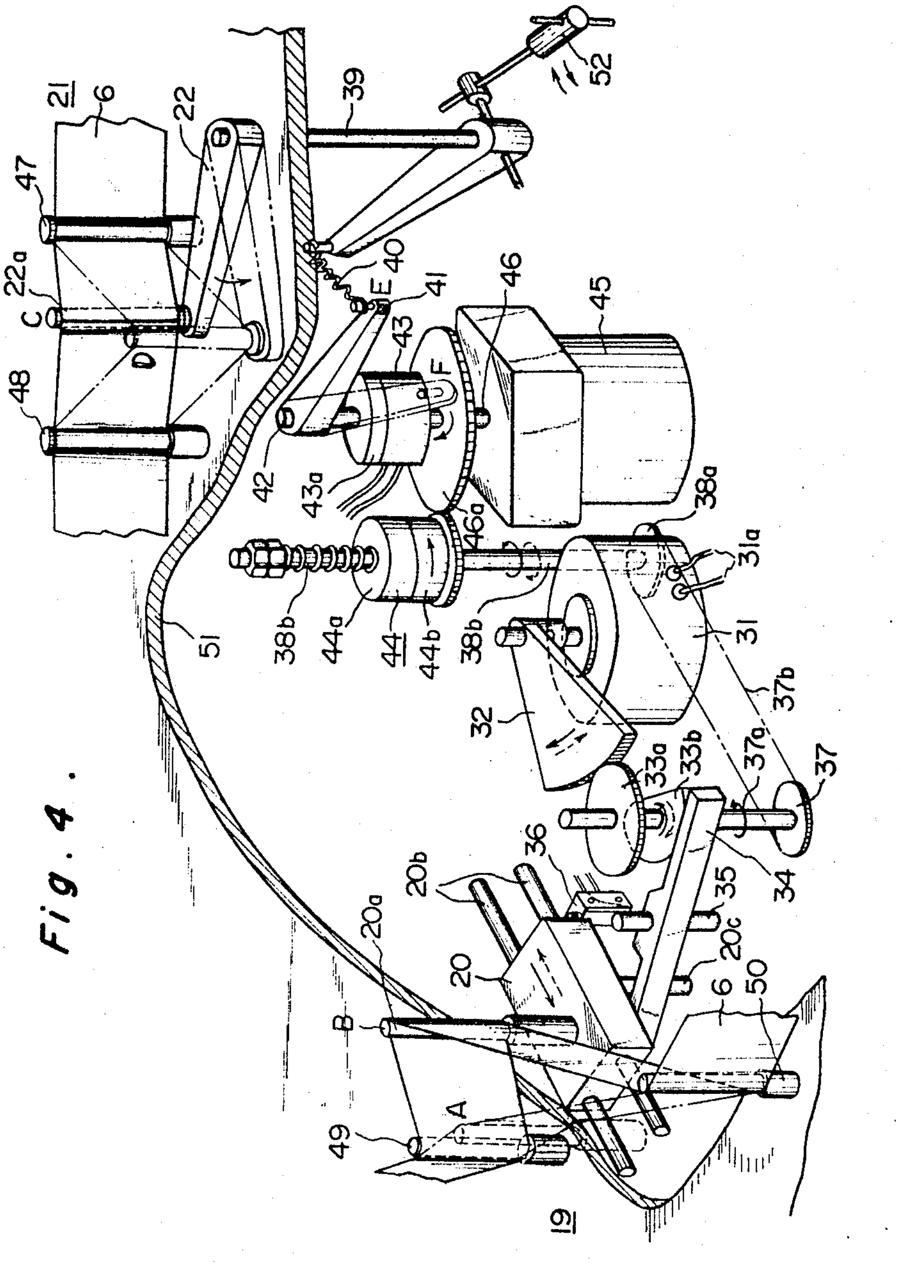
FIG. 4 is an illustrative diagram showing an arrangement of instantaneous stop-motion mechanism according to the invention.

FIG. 4 shows an embodiment of pulling back mechanism 19 and tension mechanism 21 according to the present invention. A pulling back roller 20*a* is secured onto a slide 20, which is mounted on two slide rails 20*b* in a movable manner with a very slight friction and with a small tolerance. The slide 20 slides on the rails 20*b* and moves the roller 20*a* from position A shown by dotted line in the figure to position B. The position A corresponds to the initial condition and the position B corresponds to the pulled back condition of certain length of the tape 6.

As is described more detail hereinafter, at the instant of the stop-motion instruction, a voltage is applied at the terminal 31*a* of solenoid 31 and the solenoid 31 is thus energized and actuates a sector gear 32 in the direction of the dotted arrow. The sector gear 32 in turn drives gear 33*a* which engages thereto, and via an axis 37*a* cam 33*b* to rotate in the direction of the dotted arrow. The cam 33*b* pushes abruptly one side of a lever arm 34, which is pivoted at its center about an axis 35, and the lever arm 34 moves back by its other side of lever a pin 20*c* of a slide 20, and thus moves the slide 20 in the direction of dotted arrow. By this movement of slide 20, a pulling back roller 20*a*, which is mounted on the slide 20 moves from position A to position B and pulls back the tape 6. During the stop-motion operation, the actuating voltage of solenoid 31 is continually applied and the pulling back roller 20*a* is held in the position B. The movement in the reverse direction, that is to say the movement at the change over of operation from stop-motion to slow-motion is carried out in the following manner. At an instant that an instruction of releasing back to slow-motion operation is delivered, the energizing voltage of the solenoid 31 is interrupted, and a driving power is transmitted from a continually rotating motor 45 via axis 46, gear 46*a* and gear 44*b*, to a disc 44*a*, which is secured on an axis 38*b*, by a friction force between gear 44*b* and disc 44*a*. Therefore, the axis 38*b* rotates in the direction of arrow of full line. This rotation is transmitted via a chain wheel 38*a*, a chain 37*b* and chain wheel 37 to the axis 37*a* and the axis 37*a* rotates in the direction of arrow of full line. By this rotation of axis 37*a* the cam 33*b* rotates in the direction of arrow of full line, and by the shape of cam surface the releasing movement of pin 20*c* is suitably controlled via the lever arm 34. By the shape of cam 33*b*, the back motion of the slide 20 is suitably controlled to avoid any disturbances of recording track due to variation of back tension of the running tape.

During the stop-motion operation and during the time the solenoid 31 is energized, the contact surface between 44*a* and 44*b* of the friction driving mechanism 44 is in a slipping condition and the above mentioned rotating power is not transmitted.

Said pulling back roller 20*a* actuates a microswitch 36 in the position B, which acts to detect the position of roller 20*a* whether it is in position B or not.

The tension arm 22 usually reserves a certain length of the tape for the pulling back motion of the pulling back roller 20*a* and also it acts as a usual tension arm. A tension arm roller 22*a* is secured on the tension arm 22 which is pivoted at one end to a center axis 39 in a freely rotatable manner. This axis is connected by means of a lever and a spring 40 to a position locating arm 41, which is pivoted about an axis 42. The position locating arm 41 occupies two locations E and F, which are determined by stoppers (not shown) according to the given operating mode, and drives the tension arm 22 via the driving mechanism and places it in positions C and D where the tension of the tape 6 balances with the spring force of the spring 40.

The holding operation of said reserve length of the tape is carried in the following manner. At first the position locating arm 14 is in position E and the tension arm 22 is in the position C. By an instruction of operation a magnetic clutch 43 operates and it connects the axis 46 of continuously rotating motor 45 to an intermediate axis 43*a* and this intermediate axis 43*a* brings the position locating arm 41 into the position F at which this position is determined by abutting against a stopper. Thereafter the magnetic clutch 43 slides in the holding position and keeps the position locating arm 41 at the position F. According to the movement of position locating arm 41 the tension arm 22 rotates about the axis 39 and brings the tension roller 22*a* to the position D. By this movement of tension roller 22*a* from position C to position D and two fixed guide rollers 47 and 48 the reserving operation of certain length of the tape is effected. The rotating velocity of the tension arm 22 is so selected as not to apply too much tension to the tape. For these purposes the supplying velocity of the tape and its winding up velocity are choosed to be almost equal, and by this means during the movement of tension roller 22*a* from positions C to D, the take-up reel 8 stands still and by the closing of roller 22*a* to the position D the take-up reel 8 starts its operation in a gradually increasing manner. After arriving to the position D all of the supplied tape is wound up by the take-up reel 8. In the drawing, 51 designates a top plate of the equipment.

Moreover at the pulling back operation of the tape the magnetic clutch 43 disengages its holding and the tension roller 22*a* returns from position D to position C by the tension of the tape. A damper 52 is provided in the mechanism in order to prevent a overshooting operation of the tension roller 22*a* and also to prevent undesirable vibrating operation of the tape. During the movement of the tension roller 22*a* from position C to position D said damper 52 returns to the normal position by means of a release spring internally housed in the damper.

The overall operation of the equipment will be described more detail hereinafter.

(1) *Fast feeding, rewinding and standard reproducing operation.*—In the case of these operations both of the tension arm 22 and the pulling back roller 20*a* are not actuated and keeping the positions C and A respectively. The equipment operates as an ordinary video tape recording equipment.

(2) *Slow-motion picture reproduction.*—By depressing a reproducing button (not shown), the magnetic clutch 43 of the tension arm 22 operates and moves the tension roller 22*a* from position C to position D and thus reserves a certain length of the tape supplied by slow capstan 25 shown in FIG. 2. After the arrival of tension roller 22*a* in the position D, the supplied tape 6 is wound up by the take-up reel 8. During the slow-motion picture reproducing the tension roller 22*a* always keeps the position D. The movement of the tension roller 22*a* from position C to position D takes about 2 seconds.

(3) *Instantaneous stop-motion operation.*—By depressing the instruction button (not shown), a cue signal is recorded on cue track 29 of the tape 6 by the cue signal recording head 23 as shown in FIG. 2, and thereafter the supply reel 1 and the take-up reel 8 will be stopped. As soon as the tape is stopped, the magnetic clutch 43 of the tension arm 22 is disengaged and the pulling back roller 20*a* moves from position A to position B. At the same time the tension roller 22*a* moves from position D to position C by the tension of the tape 6. By the above movement of the pulling back roller 20*a* and the tension roller 22*a*, a certain length of the tape 6 is thus quickly pulled back and reserved without causing undesirable vibration in a very short period of time of about 0.3 second. During the above operation both of the tape reels remain stopped.

(4) *Releasing of the instantaneous stop-motion operation.*—As soon as the releasing instruction is delivered, a quick tracking operation is effected by detecting tape position by means of the rotary control head assembly 24. At the same time the pulling back roller 20*a* is released and returns from position B to position A by the back tension of the tape 6 while keeping the tape tension unchanged. Also at the same instance, the magnetic clutch 43 of the tension roller 22*a* actuates and carries a reserving operation of the tape 6 for the next instantaneous stop-motion operation. Moreover, at the same time, an operating voltage is applied to both of the driving means of the reels, however, the tape 6 is fed gradually from the supply reel 1 as the closing of the pulling back roller 20*a* towards the position A, while the take-up reel 8 gradually wind-up the tape as the closing of the tension roller 22*a* towards the position D. Back speed of the pulling back roller 20*a* is determined by the cam mechanism 33*b* and the friction driving mechanism 44 act as a buffer for the sudden variation of the tension of the tape 6.

Figures 3A, 3B, 3C, 3D, 3E, 5:
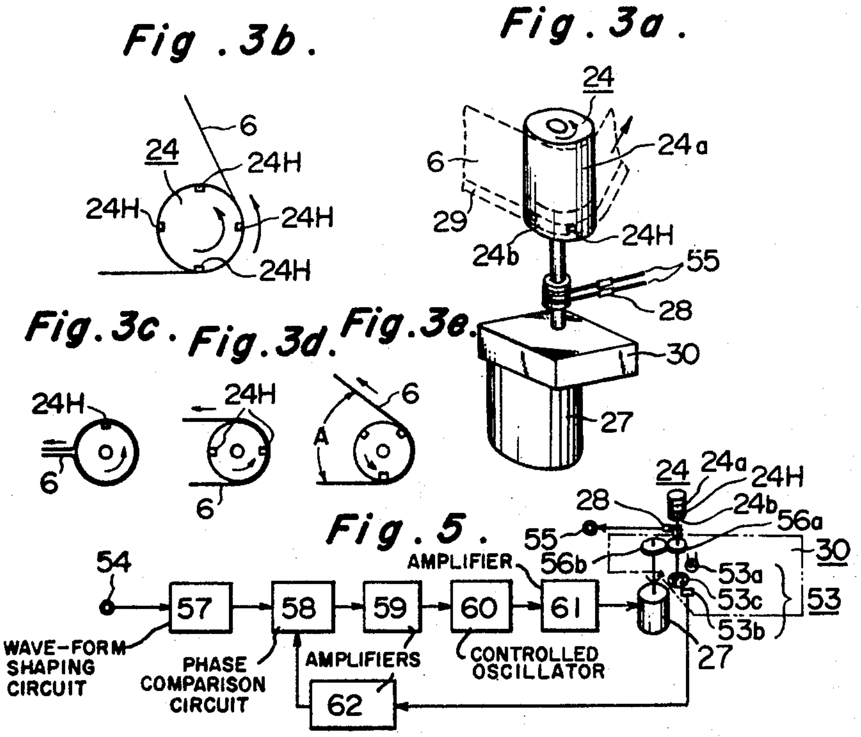
FIG. 5 is a block diagram of driving circuit arrangement for driving the rotary control track head drum according to the invention.

FIG. 5 illustrates the driving system of the rotary control head assembly 24, the system of the present invention.

In FIG. 5, the rotation of the rotary head drum 24*b* shown in FIGS. 3–*a* and 3–*b* is controlled by comparing the phase of the 6 c./s. output pulses obtained from a detector 53, detecting the rotating phase of the drum 24*b*, with the phase of 6 c./s. reference signal obtained from a standard synchronizing signal via master control equipment and applied at the input terminal 54. That is to say, the control track head assembly 24 is driven by a synchronous motor 27 via a gear mechanism 56*a* and 56*b*, and by means of a known photoelectric converting device 53, which comprises a disc 53*c* provided with four equidistant holes on apertures near its periphery and rotating with drum 24*b*, a lamp 53*a* and a photoelectric cell 53*b*, the number of rotations of the drum is detected. In the shown embodiment, a 6 c./s. pulses, which correspond to 4 times the number of the rotations of the drum 24*b*, being produced at the output terminals of the photoelectric cell 53b and these pulses are supplied via an amplifier 62 to a phase comparison circuit 58. On the other hand, a 6 c./s. reference signal derived from the master control equipment is applied through terminal 54 and a wave form shaping circuit 57 to the phase comparison circuit 58. This circuit produces at the output terminal an error signal by comparing said two signals and delivers the produced error signal to a controlled oscillator 60 via an amplifier 59. Said controlled oscillator is controlled by the error signal and changes phase and frequency of its output signal and supplies a driving signal to the motor 27 via an amplifier 61. Said controlling is affected that to control the rotation of the motor to make the phase difference zero at the phase comparison circuit 58.

As an embodiment of the invention as shown in FIG. 3–*b*, there are provided four heads 24H in the rotary control head drum 24*b* and the wrapping part of the tape is slightly longer than the interval of two adjacent heads 24H as shown in the figure, therefore always one frame pulse of the recorded frame pulses on the tape 6 is present in the wrapped part of the tape which corresponding to a peripheral length of two adjacent heads in the head drum 24*b*. The head drum 24*b* is driven to rotate at a rate of 1.5 c./s., and 6 c./s. frame pulses can be obtained from output terminal 55 by connecting electrically each output of the head through a slip-ring mechanism 28.

The operation of the tape running system at the changing over operation from stop-motion picture reproduction to slow-motion reproduction will be described hereinafter.

As explained referring to FIGS. 3–*a*, 3–*b* and 5, during the stop-motion operation the tape is kept still, and 6 c./s. pulses are derived from the stationary tape by means of the rotary control head assembly 24 through the output terminal 55. The timing of the above mentioned frame pulse is dependent upon the position where the tape stopped, i.e. the phase of the frame pulse leads or lags depending upon whether the stopping position of the tape is behind or ahead of a certain reference tape stopping position. A reproduction of phase lagging pulse means that the tape is stopped at a position ahead of the reference position. Assuming said time difference between the reproduced frame pulse and the 6 c./s. reference pulse is $\Delta\theta$, and also assuming that the tape is driven in normal running speed, the running distance of the tape during the period of $\Delta\theta$ corresponds to the distance between the actual stopping position of the tape wherein the tape occupied before its starting and a reference position of tape stopping. Therefore at the changing over operation from a stop-motion to slow-motion, by controlling the starting time of tape running to coincide at an instant of reproduced frame pulse reproduced from the stopping tape reproduced by the rotary control head assembly 24, it is always possible to obtain a constant initial phase difference regardless of the stopping position, which initial phase difference corresponds to an initial phase difference of the case that the tape is started at a reference instant from a certain reference starting position, and thus able to make said $\Delta\theta$ always be zero. In this case the reference instant and the reference starting position are choosed to make the $\Delta\theta$ be zero. By this means it is possible to make a exact synchronizing of the tape running system by means of 48 c./s. control signal reproduced from the tape in a very short period, after the build-up of tape running.

Even it was described with referring to the FIG. 3–*b* as an embodiment in which four heads 24H are provided in the rotary control track head assembly 24 and the tape wrapping angle is about 90°, the present invention is not limited to this embodiment only, but the number of the heads can be either 1, 2 or 3 as shown in FIGS. 3–*c*, 3–*d* and 3–*e*. In these cases the diameter of head drum 24*b* may be decided so as to reproduce at least one frame pulse during its 1, ½ and ⅓ rotation respectively. By each of these arrangement the tape can be controlled by the same principle as described with reference to FIG. 3–*b*. The relation between an overwrapping angle A of the tape 6 to the head assembly 24*b* and the number *n* of head 24H can be expressed by the following equation:

$$A \leqq 360/n$$

Figure 6:
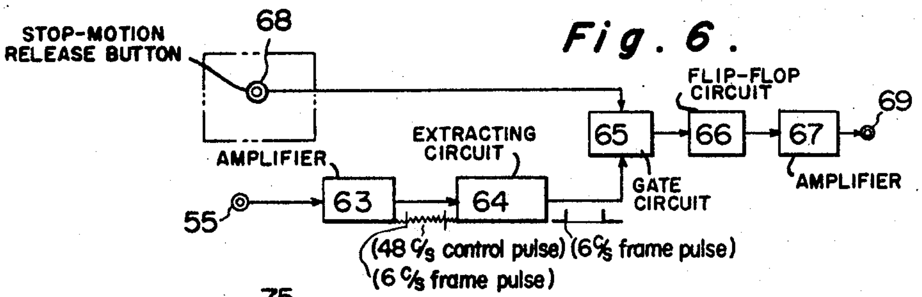
FIG. 6 is a block diagram of the circuit arrangement of tape controlling system for changing over from a stop-motion condition to a slow-motion condition.

FIG. 6 shows a block diagram of the arrangement for gating out the frame pulses from the control track signal reproduced by the rotary control head 24H.

The 6 c./s. pulse produced by the rotary control head assembly 24, together with 48 c./s. simultaneously produced by the same head assembly 24, is applied to the terminal 55 of the circuit shown in FIG. 6, and separated by an extracting circuit 64 after amplification by an amplifier 63, and supplied to a gate circuit 65. If an operator of the equipment gives an instruction of releasing from stop-motion to slow-motion by depressing the button 68 provided on the console of the video tape recording equipment, a signal is sent to gate circuit 65 and causes the circuit to gate out the frame pulse and thus change conduction of flip-flop circuit 66. The output signal of the flip-flop circuit 66 is amplified by an amplifier 67 and energizes the relay means (not shown) via a terminal 69 by the actuation of the relay means a series of tape running operation of the video tape recording equipment is started in turn, such as releasing of brakes, driving of reel motor means, driving of the pinch roller, operation of the pulling back roller and the tension arm, and the starting of the reproduction of the intermittent signal from the special reproducing head 5H (FIG. 2), and etc.

About 0.2 to 0.6 second after the above mentioned starting of the tape running, the tape 6 is pulled into the synchronized condition. The cue head 23 shown in FIG.

2 reproduces cue signal, which was recorded in the tape previously, when the stop motion instruction is delivered. Then a picture of the field, which is subsequent to the field of stop-motion picture, is reproduced as a slow-motion picture.

gate circuit 76. The gate circuit 76 changes the voltage to zero and releases the switching circuits The following Table I shows an operation sequence chart of the above mentioned operation.

Table 1 time →

| Instruction button | "SLOW-MOTION" | "STOP-MOTION" | "STOP-MOTION RELEASE" |
|---|---|---|---|
| Cue signal | | recording | reproducing |
| Tape running system of slow-motion reproducing part | Slow speed running | Pulling back the tape; Waiting for instruction | Slow speed running |
| Picture signal of slow-motion reproducing part | Reproducing of intermittent picture signal | None | Reproducing of intermittent picture signal |
| One field memory part | 12 c/s switching operation of recording and reproducing | Stopping of recording and continuously reproducing of one field picture | 12 c/s switching operation of recording and reproducing |
| Output picture signal | Slow-motion picture | Stop-motion picture | Slow-motion picture |

Figure 7:
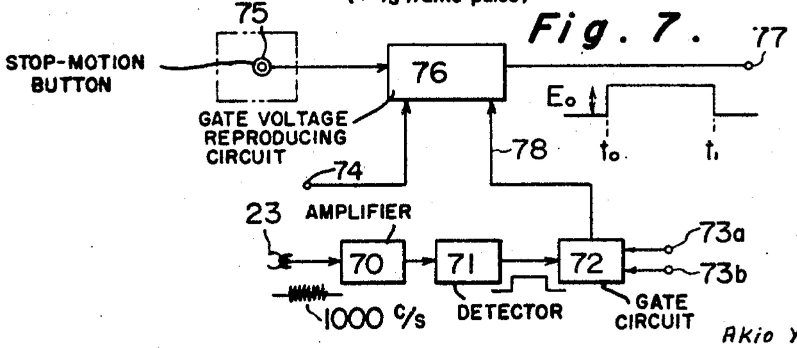
FIG. 7 is a block diagram of a control signal generator circuit controlling the switching operation of one field television signal recording and reproducing device to stop and to continue the switching operation.

FIG. 7 shows a block diagram of the signal producing system, supplying signals at the time of stop-motion instruction for every part of the equipment, such as the recording switches 14 of the one field memory part 13 shown in FIG. 1, the play back switcher 15, the field setter 17, etc. A 12 c./s. change over signal for one field recording and reproducing equipment 13 obtained from the master control signal is applied to the terminal 74. By depressing the stop-motion button 75 provided on the console of the video tape recording equipment the change over circuit of the one field memory part 13 stops still on either side of its operation, and it supplies a voltage at the terminal 77 for producing a stop-motion picture reproduction and the cue head 23 records cue signal on the cue track in the tape. Then as described before a pulling back operation of the tape and after the aforementioned operation for obtaining a slow-motion picture reproduction from a stop-motion picture reproducing condition, the tape start its running and the cue head 23 reproduces the cue signal previously recorded in the tape in a synchronized condition, and the output of the cut head 23 is amplified by an amplifier 70 and applied to a detector 71, in which the cue signal is envelope detected and applied to gate circuit 72. Side gate circuit 72 is also supplied rotary error signal of capstan 26 and drum rotary error signal of special reproducing head 5H shown in FIG. 1 via terminal **73*a* and terminal 73*b* respectively, and it consists an inhibit gate circuit, which supplies a voltage during a corresponding period of the cue signal to a gate voltage producing circuit 76 via line 78 in the case of said error signals are in a certain reference level. Said gate voltage producing circuit 76 is applied, on the other hand, a 12 c./s. changing over signal at its terminal 74 from the master control equipment. Therefore when a cue signal is detected via line 78, the voltage at the terminal 77 is thus interrupted at an instant of coincidence of the 12 c./s. signal, of which signal acting as a disconnecting signal of the changing over operation of the one field memory part 13. Then the one field memory part 13 starts the changing over operation at each 12 c./s., and the slow-motion operation is started. Then the gate circuit 72** gates out a signal and supply to the Although the present invention was described by way of an embodiment, it is not limited to the embodiment only and many modifications may be possible in the scope of the invention, for instance the system of the invention can be applicable for the control of the running system of the ordinary video tape recording devices.

What we claim is:

1. A video tape recording and reproducing system comprising a tape supply reel; a tape take-up reel; and a tape extending from said supply reel to said take-up reel along a predetermined path, said tape including a video track for recording video signals and a frame track for recording frame pulses; a readhead means for reading the video signals when the tape is moving; first means moving said tape past said readhead at a predetermined rate; second means for stopping the forward travel of the tape and pulling a part of the tape back in response to a first actuation device; third means for receiving a master control standard signal, and generating a start signal which is fed to said first means and which represents a phase difference information between the frame pulses on the tape and the master control signal such that the tape begins moving past readhead at an instant of time such that the frame pulses on said tape move past the readhead in synchronism with the master control standard signal regardless of the pulled-back position on the tape relative to said readhead and the build-up time it takes for the tape to move at predetermined constant velocity.

2. A video tape recording and reproducing system as set forth in claim 1 wherein said second means comprises a tension and reserve supply roller engaging said tape and mounted for movement across the path of travel of said tape for building or supplying a reserve length of tape, and a pullback roller positioned at a tape location ahead of said readhead and mounted for movement across the path of said tape and engaging said tape to increase its pullback length by pulling back a part of the tape already past the readhead when the supply and take-up reels are stopped, said tension roller moving toward the path of said tape and supplying the length of tape corresponding to the increase of pullback tape length caused by the movement of said pullback roller.

3. A video tape recording and reproducing systems as set forth in claim 2 wherein said pullback roller begins moving from its pull back position in response to the generation of a start signal by said third means.

4. A video tape recording and reproducing system as set forth in claim 2 wherein said tension and reserve roller is resiliently biased to its reserve position and damping means are coupled to said tension and reserve roller to dampen out any vibrations resulting from movement of the roller of tension changes within the tape.

5. A video tape recording and reproducing system as set forth in claim 1 wherein said third means comprises a control trackhead assembly to read a frame pulse on the stationary tape in its pulled-back position; said head assembly repetitiously reading the frame pulse at a predetermined rate to generate a track signal; said head assembly including a movable track head to read the frame pulse; a driving member to move said track head at a predetermined rate; a device driven by the drive member for generating an auxiliary signal corresponding to the track signal and having a predetermined phase relationship therewith; a drive member control circuit receiving a master control standard signal and said auxiliary signal, comparing characteristics of these last-mentioned signals and generating an error signal which is fed to said drive member to change the phase thereof such that the auxiliary signal phase relative to said master control standard signal becomes some predetermined value; gate means the output of which controls the tape starting movement from its pulled-back position; a second actuation device feeding a control signal to said gate means; said gate means connected to receive the track signals from said control trackhead assembly such that when said second actuation device is actuated, the next generated track signal passes through said gate means causing the starting movement of said tape at the correct time required for the frame pulses moving past said readhead to be in synchronism with the master control standard signal.

6. A video tape recording and reproducing system as set forth in claim 5 wherein said drive member control circuit compares the phases of the master control standard signal and the auxiliary signal, and said drive member comprises a synchronous motor.

7. A video tape recording and reproducing system as set forth in claim 5 wherein said movable track head comprises a head drum mounted for rotation with the tape wrapped about a part of the drum wall through an angle sufficient to include one frame pulse, said drum rotating at an angular velocity such that the peripheral velocity of the drum wall is the same as the standard velocity of the moving tape, and a frame track head mounted on the drum wall and aligned with the tape frame track for reading the associated frame pulse contacting the drum when the tape is stopped.

8. A video tape recording and reproducing system as set forth in claim 7 wherein said drive member control circuit compares the phases of the master control standard signal and the auxiliary signal, and said drive member comprises a synchronous motor, and said device includes a member mechanically connected to rotate with said drum and further including auxiliary signal generating means generating auxiliary signals at a rate corresponding to the rotation rate of said member.

References Cited

UNITED STATES PATENTS 3,051,777 8/1962 Lemelson.

ROBERT L. GRIFFIN, *Primary Examiner.*

H. W. BRITTON, *Assistant Examiner.*

U.S. Cl. X.R.

179—100.2